Jan. 16, 1940.                A. G. HOPKINS                2,187,688
                METHOD OF PACKING AND SEALING FOOD PRODUCTS
                            Filed Jan. 5, 1938
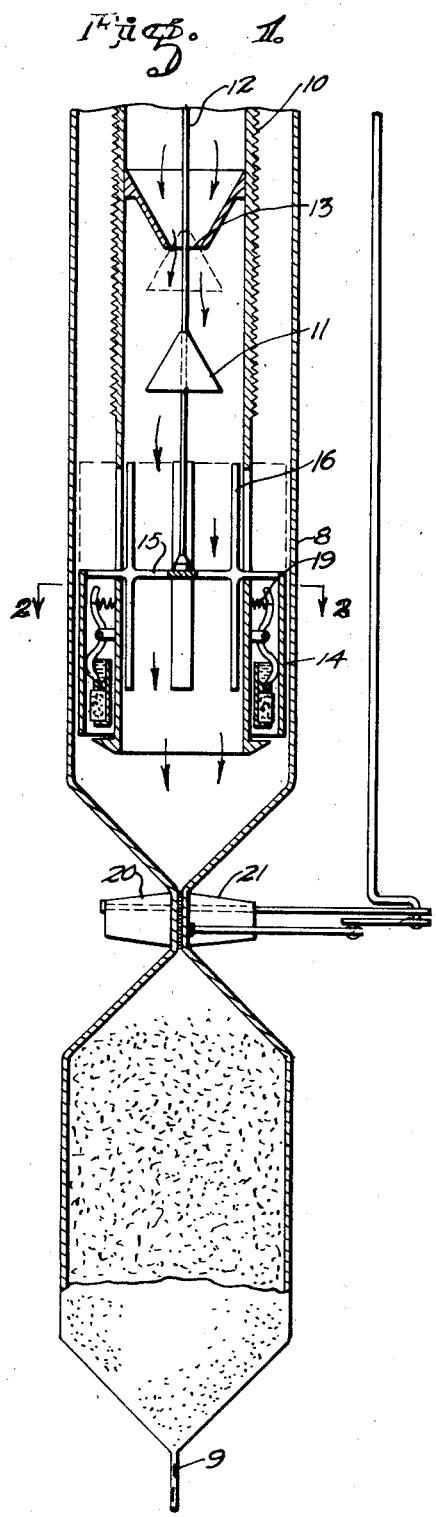
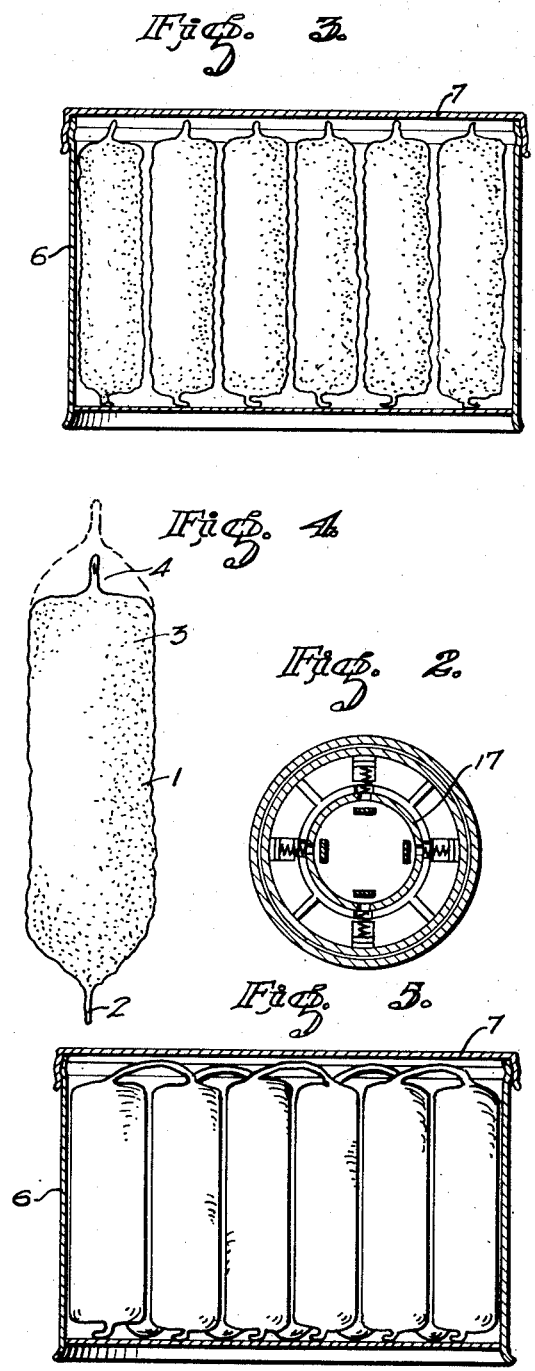
INVENTOR
ARTHUR G. HOPKINS
BY *James M. Abbett*
ATTORNEY Patented Jan. 16, 1940

2,187,688

UNITED STATES PATENT OFFICE 2,187,688

METHOD OF PACKING AND SEALING FOOD PRODUCTS

Arthur G. Hopkins, Sherman, Tex., assignor to Samuel H. Berch, Beverly Hills, Calif.

Application January 5, 1938, Serial No. 183,416

3 Claims. (Cl. 99—152)

This invention relates to the packaging of coffee or other granular or pulverulent products in which the conservation of the aroma or flavor is of prime importance, and particularly pertains to a method of sealing food products.

One of the objects of the invention is to package the product in a flexible impervious wrapper and to create and maintain a vacuum in the wrapper so that it will be drawn together into intimate contact with the product holding it firmly as a substantially rigid unit notwithstanding its granular constituency, and at the same time excluding atmospheric air which ordinarily causes, through oxidation, deterioration in the flavor and aroma.

Another object of the invention is to provide a vacuum package as described, in which the flexible impervious envelope may be larger than the volume of coffee or similar product therein enclosed, so that while originally the wrapper is drawn into close engagement with the product by the atmospheric pressure on the outside, room is afforded for the aromatic gases which escape from the coffee and which in the absence of such room, would burst the package and escape. In some instances the material may fill the package and after being vacuum sealed the exterior atmospheric pressure will hold the material in a hard compacted mass.

A further object of the invention relates to the packaging of coffee or the like into individual packages as described so that for a single serving, only one sample need be opened, the vacuous condition of the other packages being perpetuated.

Still another object of the invention is to provide a container enclosing a plurality of the individual packages, each comprising the flexible impervious envelope and each maintained under individual vacuum, and the container itself being under vacuum so as to relieve the individual packages from the stress of atmospheric percolation until the container is opened by the consumer.

A further object of the invention is to provide the individual evacuated packages in the form of a continuous series of chain sealed between the individual units and being adapted to be cut off one at a time as required for use without destroying the vacuum in the remaining units.

Still another object of the invention relates to the method of packaging the coffee as above described.

Other objects of the invention will appear as the following description of exemplary embodiments of the invention proceeds.

In the drawing, throughout the several figures of which, the same characters of reference have been used to designate identical parts:

Figure 1 is a diagrammatic representation of apparatus more or less theoretical in its concept which might be used in practicing the method of the package of coffee or the like in a continuous series of links or individual packages, such as are shown in the container in Figure 5;

Figure 2 is a cross section taken along the lines 2—2 of Figure 1;

Figure 3 is a diametrical cross section through a container showing a plurality of individual packages;

Figure 4 is a view in elevation showing a single package; and

Figure 5 is a cross section of the container enclosing a plurality of individual packages arranged in a connected series.

Referring now in detail to the several figures, and first adverting to that form of the invention shown in Figure 4, the numeral 1 represents an envelope or wrapper formed of any suitable gas impervious and preferably non-hygroscopic material and of transparent character, such for example as certain grades of Cellophane or the like, or rubber compositions such as "plyofilm." This envelope is presealed at the bottom as at 2 and is charged with a quantity of coffee represented by the reference character 3 slightly less than enough to fill the envelope, leaving the space 4 shown in Figure 4, between the full and broken lines near the top. This envelope with its contents is placed in a vacuum chamber and sealed by the use of an adhesive or the application of heat. When it is withdrawn from said chamber, the atmospheric pressure on the outside pushes the envelope in against the contents at all points, and particularly at the top, obliterating the space 4, so that the coffee is held in rigid relation notwithstanding its granular character and will not shift about in the package, possibly wearing its way through, and in any event producing a quantity of dust. The vacuum pump has withdrawn atmospheric air from the interstitial spaces of the coffee and the gas impervious envelope prevents access of the outer air thereto, so that the coffee is fully protected from oxidation of its aromatic principles or escape of its aroma and a hard compacted mass will be obtained as the atmospheric pressure acts against it.

It is known that coffee loses its aroma by diffusion if exposed to atmosphere, and even in the presence of vacuum, the aroma escapes in the form of a gas probably through "breathing" of the coffee, due to temperature fluctuations. If the impervious envelope 1 fitted the mass of coffee snugly in the first instance, the pressure developed by the aromatic gases evolved from the coffee might be enough to rupture the envelope. The space 4 may be provided which when the gases have been evolved, distends the envelope into its normal original shape as indicated by the broken lines. The exterior atmospheric pressure however acts to maintain the coffee in a hard compact mass since the container is flexible and a negative pressure is within it.

The envelope 1 is designed to contain just enough coffee, preferably ground, to suffice for one serving. A plurality of the packaged envelopes 1 are placed in a container 6 as indicated in Figure 3. This container may not be gas-tight, but it is preferred to have the lid 7 fitted hermetically and to withdraw the air from the container so that the flexible envelopes of the individual units will not be subjected to osmotic diffusion while the packages are in the container, but that such diffusion shall only be possible after the container has been opened by the ultimate consumer. The individual packages may be relied upon to maintain their vacuous state throughout the period of time that may be required for using all of the packages in the container.

A form of the invention is shown in Figure 5 in which the individual units or packages are formed in a continuous series analogous to link sausages.

The reference character 8 designates a long envelope of gas impervious material sealed at the bottom only, and of a sufficient length to be constricted at a plurality of points to form as many units, for example, a dozen, as are to be packed in one container. This envelope is presealed at its lower end 9. A spout 10 leading from a coffee hopper extends within the tube 8 and is long enough to extend to adjacent the bottom of the tube at the beginning of the filling process. Within the spout 10 is a valve 11 having a stem 12, said valve being adapted to be drawn up to close the pouring aperture 13 when it is desired to cut the flow of coffee. A cylindrical distender 14 surrounds the lower end of the spout 10, said distender being operatively connected to the valve stem 12 by a cross bar 15 which projects through diametric slots 16 in the spout 10. The distender 14 also acts as a field or guard to encompass certain gluing elements at times when it is not desired that glue shall be applied to the tube. The gluing elements are constituted by four pads 17, Figure 2, saturated with a suitable adhesive and being secured to levers 18 pivotally mounted on the outside of the spout, the opposite ends of the levers being held by tensioned springs 19 so as normally to throw the pads 17 outwardly against the walls of the tube. The distender 14 maintains the wall of the tube cylindrical in the region in which it is to have the glue applied, and when it descends, it presses the glue pads away from the wall of the tube and houses them as shown in Figure 1. The glue pads are housed at the same time the valve 11 is open and exposed when the valve 11 is closed; in other words, when the coffee is running the glue pads are protected from being fouled by the coffee. Pressing dies 20 and 21 are provided for pressing the tube together in a zone to which glue has been applied, thus sealing off the charge of coffee immediately below said dies.

In operation, both the coffee hopper and the tube 1 are designed to be maintained under vacuum. The valve stem 12 is depressed, opening the valve 11 and a determined charge of coffee runs into the lowermost section. At the time that happened, the lowermost section was in the position occupied by the next to lowest section in Figure 1, and the tube 1 was being progressively moved downwardly. The dies 20 and 21 were apart sufficiently to permit this progressive movement without constricting the tube. After enough coffee has run into the lowermost section, the valve stem 12 is raised, the valve 11 closing the opening 13 and the distender 14 raising so as to release the glue pads 17. At this time, the progressive movement of the tube 1 is halted. The glue pads 17 fly out in four different radial directions and apply glue in a zone on the inner surface of the tube 1. Then the valve stem is depressed far enough to cause the distender to withdraw the glue pads, the tube then moves downward until the glue zone is between the dies 20 and 21, whereupon these dies come together and form a glue joint at the top of the lowermost section. Meanwhile, the valve 11 has opened and coffee is discharging into the second section above the said glued zone. The walls of the container may be sealed by the application of heat by suitable heat applying means instead of the gluing apparatus.

While I have in the above description disclosed an exemplary method of practicing my invention, it is to be understood that the specific details as disclosed are not to be construed as limiting the scope of the invention as claimed.

What I claim is:

1. A method of packaging material characterized as evolving a gas which consists in placing the product within a flexible, collapsible container impervious to gas and moisture thereafter exhausting the air and other gases from the container to collapse the walls of the container around the product and vacuum sealing the container whereby the pressure of atmospheric air around the container will act against the flexible walls of the container to collapse them and to thereby create a counterpressure against gas which might be evolved by the product.

2. A method of packaging initially loose comminuted material characterized as evolving gases which are emanated therefrom and which method consists in preparing a container of flexible sheet material impervious to gas and moisture and into which the product is placed thereafter sealing the container and exhausting air and other gases from the container whereby the contents of the container will be vacuumized and whereby the normal pressure of the atmospheric air surrounding the container will cause the walls of the container to collapse against the product and compact the same and will exert a counterpressure against such gases as might be evolved by the product.

3. A method of packaging initially loose comminuted coffee, characterized as evolving gases which are emanated therefrom and which method consists in preparing a container of flexible sheet material impervious to gas and moisture and into which the product is placed and exhausting air and other gases from the container and sealing the container whereby the contents of the container will be vacuumized and whereby the normal pressure of the atmospheric air surrounding the container will cause the walls of the container to collapse against the product and compact the same and will exert a counterpressure against such gases as might be evolved by the product.

ARTHUR G. HOPKINS.